Patented June 13, 1939

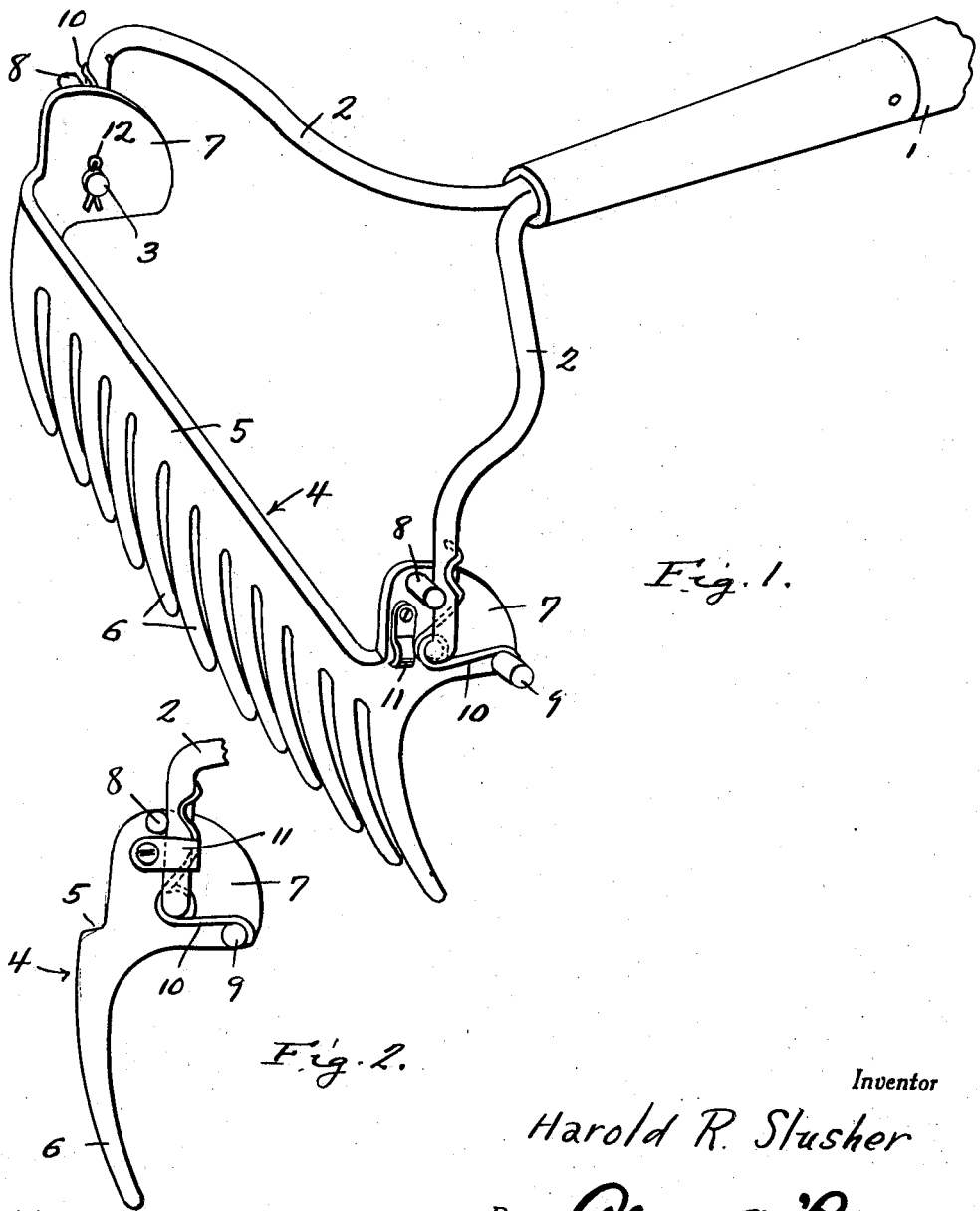

2,162,648

UNITED STATES PATENT OFFICE 2,162,648

RAKE

Harold R. Slusher, Blandinsville, Ill., assignor of one-half to Carroll R. Blackledge, Blandinsville, Ill.

Application April 23, 1938, Serial No. 203,912

2 Claims. (Cl. 55—10)

The present invention relates to new and useful improvements in rakes and has for its primary object to provide, in a manner as hereinafter set forth, an implement of this character embodying a novel construction, combination and arrangement of parts through the medium of which the teeth may be expeditiously cleaned of trash, leaves, twigs, etc.

Other objects of the invention are to provide a rake of the aforementioned character which will be comparatively simple in construction, strong, durable, highly efficient and reliable in use, compact, light in weight and which may be manufactured at low cost.

All of the foregoing and still further objects and advantages will become apparent from a study of the following specification, taken in connection with the accompanying drawing wherein like characters of reference designate corresponding parts through the several views, and wherein:

Figure 1 is a perspective view of a rake constructed in accordance with the present invention.

Figure 2 is a view in end elevation of the head, showing said head locked against swinging movement.

Referring now to the drawing in detail, it will be seen that the embodiment of the invention which has been illustrated comprises a handle 1, a portion only of which is shown. Mounted on one end of the handle 1 is a pair of arms 2 of suitable metal of substantially the shape shown to advantage in Figure 1 of the drawing. At their free ends, the arms 2 terminate in inturned spindles 3, the purpose of which will be presently set forth.

Mounted for swinging movement on the arms 2 is a head which is designated generally by the reference numeral 4. The head 4 includes a metallic bar 5 having formed integrally therewith a series of teeth 6. On the ends of the bar 5 a pair of substantially segmental plates 7 are provided, such plates extending upwardly and rearwardly from said bar. The plates 7 are journaled on the spindles 3.

Projecting outwardly from the plates 7 are pins 8 and 9 constituting stops which are engageable with the arms 2 for limiting the swinging movement of the head 4 in opposite directions on the spindles 3. Springs 10 are mounted on the spindles 3 and have one end engaging with the arms 2 and their other ends engaging with the stop pins 9 for returning the head 4 to operative position after each cleaning operation.

Locking elements 11 are mounted on the plates 7 and engageable with the arms 2 for securing the head 4 against swinging movement in operative position when desired.

It is thought that the operation of the invention will be readily apparent from a consideration of the foregoing. The springs 10 yieldingly maintain the head 4 in operative position, as seen in Figure 1 of the drawing, with the stops 8 engaging with the arms 2. The implement may thus be drawn rearwardly in the usual manner for raking. On the return or forward stroke, by exerting a downward pressure on the head 4 said head will be caused to swing rearwardly on the spindles 3 against the tension of the springs 10 in a manner to strip leaves, twigs, trash, etc., from the teeth 6. When it is desired to use the head 4 on both the rearward and forward stroke, as when pulverizing soil, the locking elements 11 are engaged with the arms 2, as seen in Figure 2 of the drawing, for positively securing the head 4 against swinging movement. The shape of the arms 2 is such that a comparatively large pile of leaves, trash, etc., may be raked without interference by said arms. Also, the user does not have to bend over as much as with the usual rake by reason of the shape of the arms 2. Any suitable means may be provided for securing the spindles 3 in the plates 7, as at 12.

It is believed that the many advantages of a rake constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

What is claimed is:

1. A rake comprising a handle, a pair of arms on one end of said handle, inturned spindles on the free ends of the arms, a head mounted for swinging movement on the arms, said head including a bar, a series of teeth on said bar and substantially segmental plates on the ends of the bar journaled on the spindles, pins projecting from the plates and engageable with the arms for limiting the swinging movement of the head in opposite directions, resilient means connected to the head for returning said head to operative position, and means on the plates engageable with the arms for positively securing the head in operative position.

2. A rake comprising a handle, a pair of arms on one end of said handle, inturned spindles on the free ends of said arms, a head mounted for swinging movement on the arms, said head including a bar, a series of teeth on said bar, substantially segmental plates on the ends of the bar journaled on the spindles, pins projecting from the plates and engageable with the arms for limiting the swinging movement of the head in opposite directions, springs mounted on the spindles and having one end engaged with the arms and their other ends engaged with certain of the pins for returning the head to operative position, and locking elements mounted on the plates and engageable with the arms for positively securing the head in operative position.

HAROLD R. SLUSHER.